United States Patent
Jeong

[19]

[11] Patent Number: 6,144,357
[45] Date of Patent: Nov. 7, 2000

[54] DRIVING VOLTAGE GENERATING CIRCUIT VOLTAGE FOR LIQUID CRYSTAL DISPLAY

[75] Inventor: Tae Bo Jeong, Yongin, Rep. of Korea

[73] Assignee: Hyundai Electronics Industries Co., Ltd., Kyoungki-do, Rep. of Korea

[21] Appl. No.: 09/106,570

[22] Filed: Jun. 29, 1998

[30] Foreign Application Priority Data

Jun. 28, 1997 [KR] Rep. of Korea ................... 97-28796

[51] Int. Cl.$^7$ ...................................... G09G 3/36
[52] U.S. Cl. ........................... 345/100; 345/94; 345/211
[58] Field of Search ................... 345/87, 88, 89, 345/98, 99, 100, 94, 95, 96, 211, 212, 213, 204, 208, 209, 210

[56] References Cited

U.S. PATENT DOCUMENTS

| | | | |
|---|---|---|---|
| 4,324,991 | 4/1982 | Tamaki | 345/211 |
| 5,065,148 | 11/1991 | Yee-Kwong | 340/784 |
| 5,635,865 | 6/1997 | Moon et al. | 345/211 |

FOREIGN PATENT DOCUMENTS

6266313  9/1994  Japan.

*Primary Examiner*—Xiao Wu
*Attorney, Agent, or Firm*—Selitto & Associates

[57] ABSTRACT

A driving circuit is provided for generating driving voltages of a liquid crystal display comprising a plurality of thin film transistors, each of which includes a source, drain, and gate. The driving circuit includes: a switching part for generating first to fourth control signals which swing between a first power voltage and a second power voltage using first to fourth input logic control signals; a driving voltage generating part controlled by the first to the fourth control signals, for generating gate on and off voltages for turning on and off said thin film transistors by raising said second power voltage and dropping said first power voltage; and a voltage maintenance part for maintaining said gate on and off voltages inputted from said driving voltage generating part at a selected voltage level.

21 Claims, 7 Drawing Sheets

FIG.3A a ⎯⎯⎯⎯|‾‾‾‾‾|⎯⎯⎯⎯⎯⎯⎯⎯⎯ ⎤Logic Voltage
FIG.3B b ⎯⎯⎯|_____|⎯⎯⎯⎯⎯⎯⎯⎯⎯ ⎤Logic Voltage FIG.3C c ⎯⎯⎯⎯⎯⎯|‾‾‾‾|⎯⎯⎯⎯⎯⎯ ⎤Logic Voltage
FIG.3D d ⎯⎯⎯⎯⎯⎯|____|⎯⎯⎯⎯⎯⎯ ⎤Logic Voltage

FIG.6

DRIVING VOLTAGE GENERATING CIRCUIT VOLTAGE FOR LIQUID CRYSTAL DISPLAY

BACKGROUND OF THE INVENTION

The present invention generally relates to a driver of liquid crystal displays. More particularly, the invention relates to a driving voltage generating circuit of a liquid crystal display for generating on and off voltages of switching elements for liquid crystal displays.

A thin film transistor ("TFT") is widely used as a switching element for turning on and off a unit pixel of a liquid crystal display ("LCD"). Such a TFT has an electrical characteristic of high voltage and low current. Even through TFT generally needs a considerably high turning on voltage (hereinbelow referred to as "gate on voltage") of 14 V and more and a turning off voltage (hereinbelow referred to as "gate off voltage") of 5 V or less, current consumption is very little.

Thus, so as to operate a display controlled by voltage such as a liquid crystal display, it is seen that a driver having high turning on voltage and low turning off voltage is highly desired. For instance, a driving circuit capable of supplying stable voltage in effective data period is highly desired.

In a conventional driver such as a step up DC/DC circuit for generating driving voltage of LCDs, an inductor is used as a driving voltage generator. The inductor, however, increases current consumption.

SUMMARY OF THE INVENTION

Accordingly, it is an object of the present invention to generate high gate on voltage at a desired level and low off voltage at a desired level for switching thin film transistor of a liquid crystal display without excessive consumption of power voltage.

According to one aspect of the present invention, a driving circuit for generating driving voltage of a liquid crystal display comprises: a switching part for generating first to fourth control signals which swing between a first power voltage and a second power voltage, using first to fourth input logic control signals; a driving voltage generating part controlled by the first to the fourth control signals, for generating gate on and off voltages for turning on and off said thin film transistors by raising said second power voltage and dropping said first power voltage; and a voltage maintenance part for maintaining said gate on and off voltages inputted from said driving voltage generating part at a selected voltage level.

According to another aspect of the present invention, a driving circuit having the above constitution, further includes a reverse current preventive part for preventing current of said voltage maintenance part from flowing to said driving voltage generating part.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments give below, serve to explain the principles of the invention.

FIGS. 5A to 5H show waveforms at respective nodes of the simulator of FIG. 4.

DESCRIPTION OF THE PREFERRED EMBODIMENT

Hereinbelow, with reference to the accompanying drawings, a preferred embodiment of this invention will be described.

Figure 1:
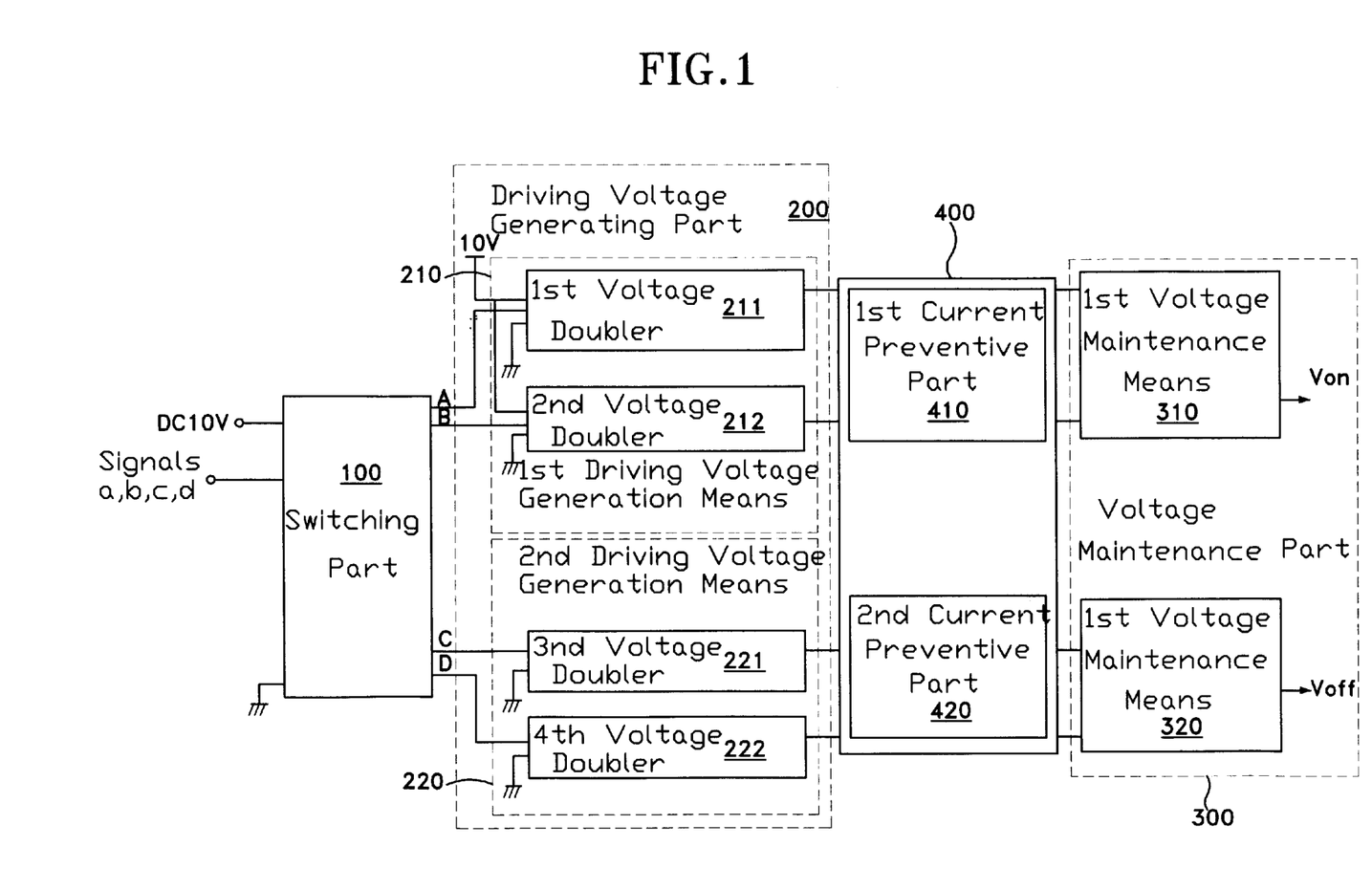
FIG. 1 is a block diagram of a driving voltage generating circuit of a liquid crystal display according to embodiments of the present invention.
Figure 2:
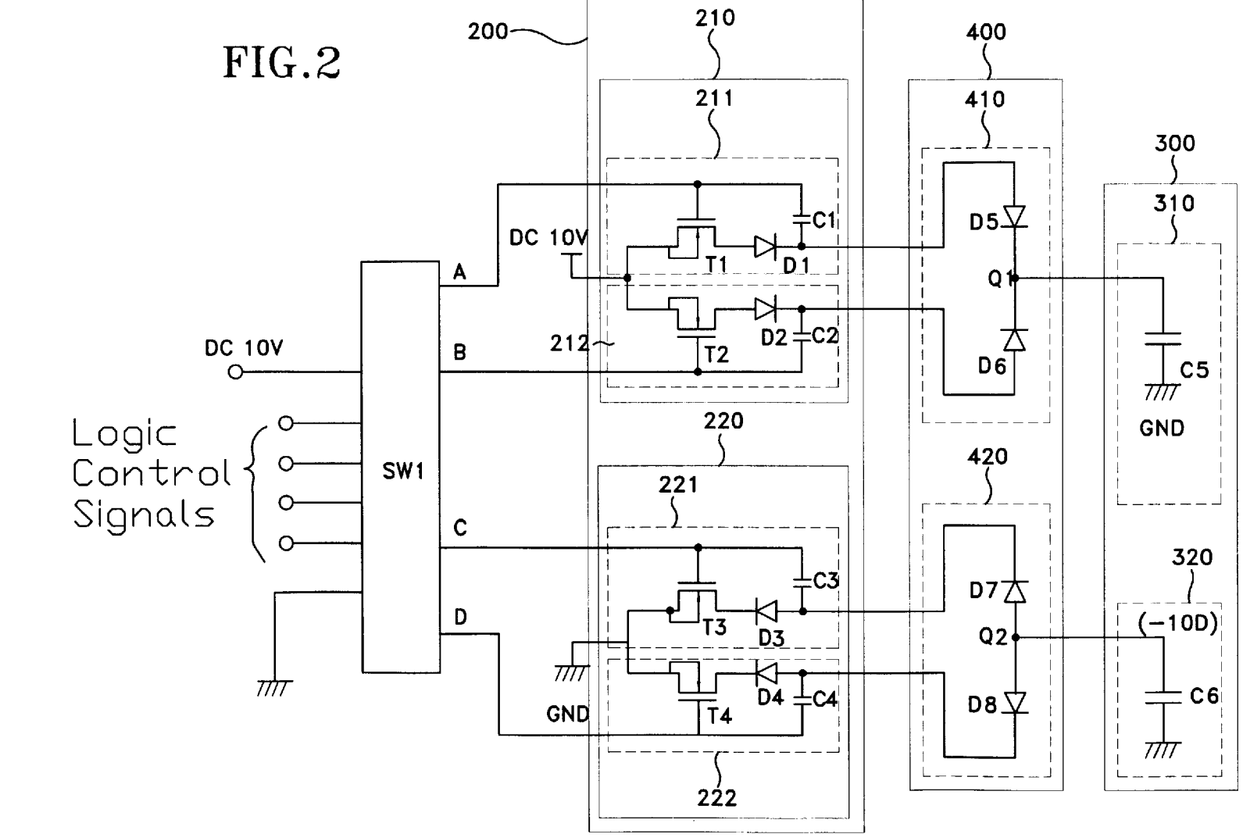
FIG. 2 is an equivalent circuit diagram of the driving voltage generating circuit of FIG. 1.

FIG. 1 is a block diagram of a driving voltage generating circuit of a liquid crystal display according to an embodiment of the present invention and FIG. 2 is an equivalent circuit diagram of the driving voltage generating circuit of FIG. 1.

Referring to FIGS. 1 and 2, a driving circuit for generating driving voltage of a liquid crystal display includes: a switching part 100 for generating first to fourth control signals of A, B, C, and D which swing between a first power voltage and a second power voltage, using first to fourth input logic control signals of a, b, c, and d; a driving voltage generating part 200 which is controlled by the first to the fourth control signals of A, B, C, and D, for generating gate on and gate off voltages for turning on and off thin film transistors of the liquid crystal display by raising the second power voltage and dropping the first power voltage a voltage maintenance part 300 for maintaining the gate on and gate off voltages inputted from the driving voltage generating part 200 at selected voltage levels; and a reverse current preventive part 400 for preventing current of the voltage maintenance part 300 from reversely flowing to the driving voltage generating part 200. Here, the first and second control signals have phase opposite to each other and the third and fourth control signals have phase opposite to each other.

The switching part 100 includes an analog switch SW1 to which a power voltage of about 10 V is applied. The analog switch SW1 swings in a range of about 0 V to about 10 V according to the logic control signals a, b, c, and d.

The driving voltage generating part 200 includes a first driving voltage generating means 210 for generating the gate on voltage by raising the second power voltage to a selected level using the first and second control signals A and B among the first to fourth control signals of A to D applied from the switching part 100; and a second driving voltage generating means 220 for generating the gate off voltage by dropping the first power voltage at 0 V or ground voltage using the third and fourth control signals of C and D among the first to fourth control signals of A to D applied from the switching part 100.

The first driving voltage generating means 210 includes first and second voltage doublers 211 and 212. The first and second doublers 211 and 212 generate the gate on voltage by raising the second power voltage from the first and second control signals applied from the switching part 100. The doublers 211 and 212 include: MOS transistors T1 and T2 in which the first and second control signals are applied to gates thereof and power voltage of 10 V is applied to sources thereof; capacitors C1 and C2 respectively connected between the gate of the MOS transistor T1 the drain of the MOS transistor T1 and between the gate of the MOS transistor T2 and the drain of the MOS transistor T2; and diodes D1 and D2 respectively connected between the drain of the MOS transistor T1 and the capacitor C1 and between the drain of the MOS transistor T2 and the capacitor C2.

The second driving voltage generating means 220 includes third and fourth voltage doublers 221 and 222 for generating the gate of voltage by dropping the first power voltage of 0 V (Ground voltage) to −10 V using the third and fourth control signals applied from the switching part 100. The doublers 221 and 222 include: MOS transistors T3 and T4 in which the third and fourth control signals are applied to gates thereof and power voltage of 0 V is applied to sources thereof; capacitors C3 and C4 respectively connected between the gate of the MOS transistor T3 and drain of the MOS transistor T3 and between the gate of the MOS transistor T4 and drain of the MOS transistors M4; and diodes D3 and D4 respectively connected between the drain of the MOS transistor T3 and the capacitor C3 and between the drain of the MOS transistor T4 and the capacitor C4.

The voltage maintenance part 300 includes a first voltage maintenance means 310 including a condenser C5 and a second voltage maintenance means 320 including a condenser C6. The condenser C5 whose one end is grounded and the other end is connected to the first driving voltage generating means 210 via the reverse current preventive part 400, maintains the gate on voltage Von inputted from the driving voltage generating part 200 at a first selected level. And, the condenser C6 whose one end is grounded and the other end is connected to the second driving voltage generating means 220 via the reverse current preventive part 400, maintains the gate off voltage inputted from the driving voltage generating part 200 at a second selected level.

The reverse current preventive part 400 includes a first current preventive means 410 and a second current preventive means 420. The first current preventive means 410 prevents the gate on voltage Von which is maintained by the first voltage maintenance means 310 of the voltage maintenance part 300 from inversely flowing to the first driving voltage generating means. And, the second current preventive means 420 prevents the gate off voltage which is maintained by the second voltage maintenance means 320 from inversely flowing to the second driving voltage generating means 220 of the driving voltage generating part 200.

The first current preventive means 410 includes diodes D5 and D6 both of which are forwardly connected between the first driving voltage generating means 210 and the first voltage maintenance means 310. The second current preventive means 420 includes diodes D7 and D8 both of which are forwardly connected between the second driving voltage generating means 220 and the second voltage maintenance means 320.

Figure 3A:
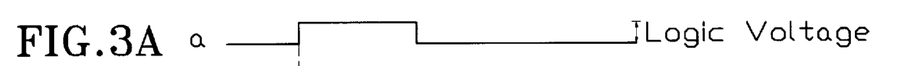
FIG. 3A to FIG. 3N are waveforms which appear at the outputs of the driving voltage generating circuit of FIG. 2.
Figure 3B:
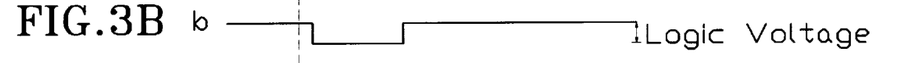
Figure 3C:
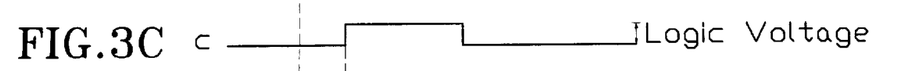
Figure 3D:
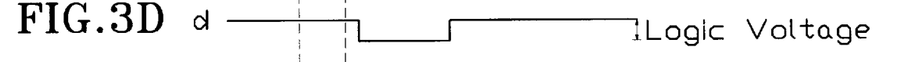
Figure 3E:
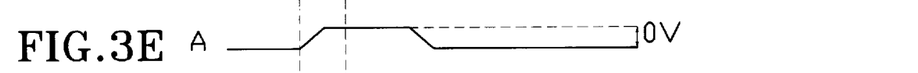
Figure 3F:
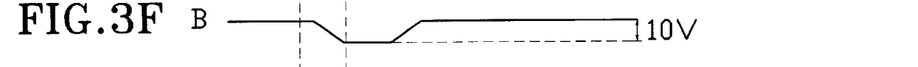
Figure 3G:
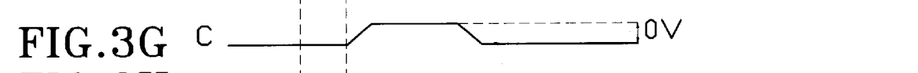
Figure 3H:
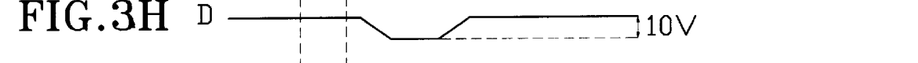
Figure 3I:
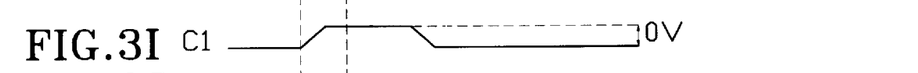
Figure 3J:
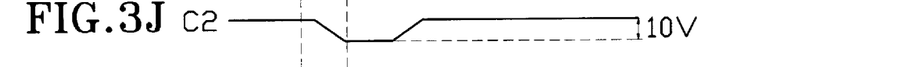
Figure 3K:
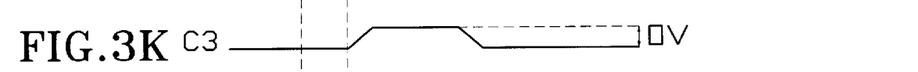
Figure 3L:
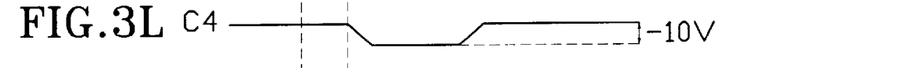
Figure 3M:
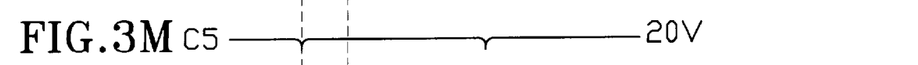
Figure 3N:
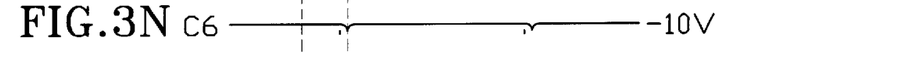

Next, with reference to FIG. 2 and FIG. 3A to FIG. 3N, operation of the driving circuit with the above constitution will be explained below.

The analog switch SW1 of the switching part 100 shown in FIG. 2 receives logic control signals a, b, c, and d as input signals as shown in FIG. 3A to FIG. 3D. As power voltage of DC 10 V is applied, the analog switch SW1 of the switching part 100 outputs control signals A, B, C, and D as shown in FIG. 3E to 3H. Here, the control signals swing in a range of 0 V to 10 V. The control signals A, B, C, and D are respectively inputted into the driving voltage generating part 200. In further detail, the control signal A is inputted into the first voltage doubler 211, the control signal B is inputted into the second voltage doubler 212, the control signal C is inputted into the third voltage doubler 221, and the control signal D is inputted into the fourth voltage doubler 222. As gate on voltages corresponding to the control signals A and B of FIG. 3E and FIG. 3F are applied to the gates of the transistors T1 and T2, the first and second doublers 211 and 212 convert input power voltage of 10 V to 20 V. Meanwhile, the third and fourth doublers 221 and 222 also convert input power voltage of 0 V to −10 V as shown in FIG. 3I when gate on voltages corresponding to the control signals of C and D of FIG. 3G and FIG. 3H are applied to the gates of the transistors T3 and T4.

Next, the gate on voltages and gate off voltages are applied to the voltage maintenance part 300 through the current preventive part 400, and are then maintained at smooth signals having constant levels by the condensers C5 and C6. Accordingly, as shown in FIGS. 3M and 3N, gate on voltage of 20 V and gate off voltage of −10 V are respectively produced.

In the first driving voltage generating means 210, since the first and second voltage doublers 211 and 212 act as full wave rectifiers, it is prevented that the gate on voltage becomes smooth to 15 V between 10 V and 20 V. Here, in order to prevent riffle which is generated in node Q1 of the first current preventive part 410, the MOS transistors T1 and T2 are turned on with a time interval between them. At this time, so as to produce such time interval, the logic control signals a and b are overlapped at high level state of each signal to each other. Due to the existence of the capacitors C1 and C2, turn off time of the MOS transistors T1 and T2 of the first driving voltage generating means 210 is delayed, and thereby leakage current flows between the source and drain of the MOS transistors T1 and T2. To prevent such a leakage current, a Shottkey diode is selected for the diodes D1 and D2 of the first and second doublers 211 and 212, and thereby the current flows only in one direction between the MOS transistor T1 and the capacitor C1 and between the MOS transistor T2 and the capacitor C2.

Like the first driving voltage generating means, since the third and fourth voltage doublers 221 and 222 act as full wave rectifiers, it is prevented that the gate off voltage becomes smooth to −5 V between 0 V and −10 V. Here, in order to prevent riffle which is generated in node Q2 of the second current preventive part 420, the MOS transistors T3 and T4 are turned on with a time interval between them. At this time, so as to produce such time interval, the logic control signals a and b are overlapped at high level state of each signal to each other. Due to the existence of the capacitors C3 and C4, turn off time of the MOS transistors T3 and T4 of the second driving voltage generating means 220 is delayed, and thereby leakage current flows between the source and drain of the MOS transistors T3 and T4. To prevent such a leakage current, a Shottkey diode is selected for the diodes D3 and D4 of the third and fourth doublers 221 and 222, and thereby the current flows only in one direction between the MOS transistor T3 and the capacitor C3 and between the MOS transistor T4 and the capacitor C4.

Figure 4:
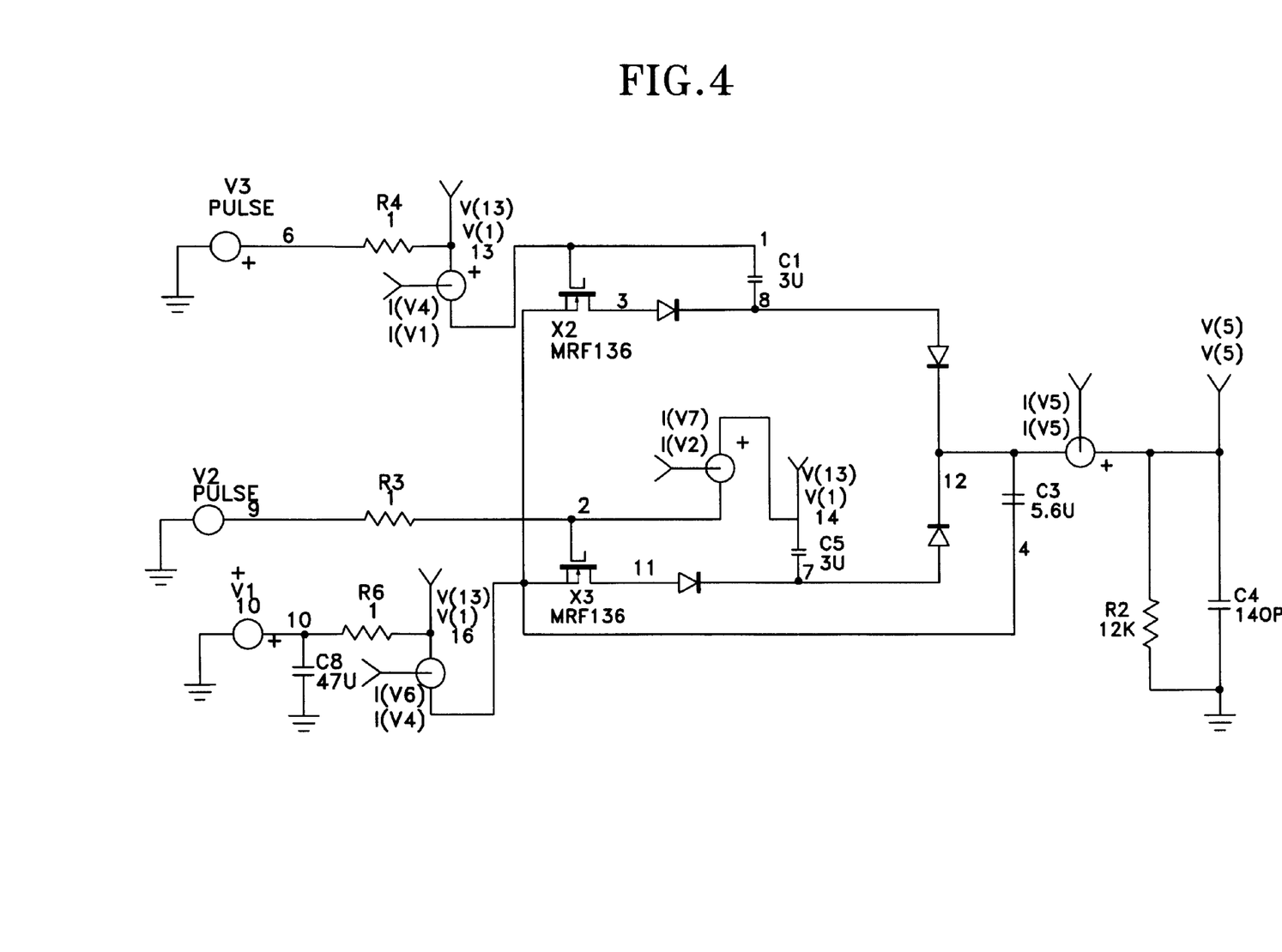
FIG. 4 is a circuit diagram of a simulator for simulating operation of the driving circuit of FIG. 2.
Figure 5A:
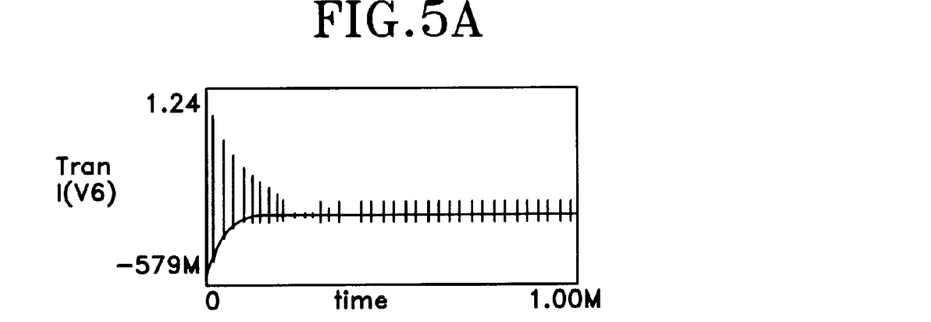
Figure 5B:
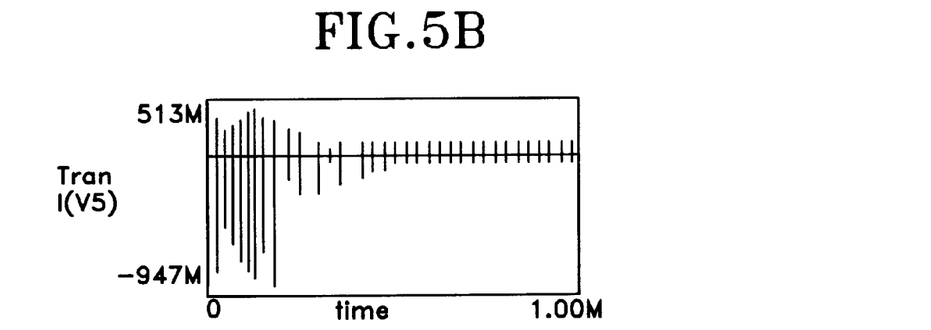
Figure 5C:
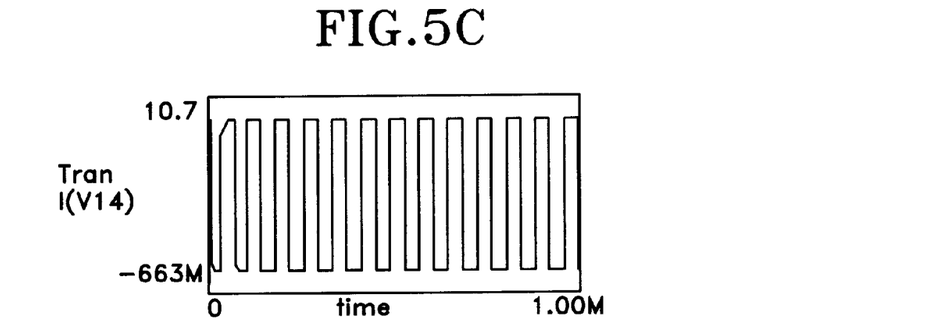
Figure 5D:
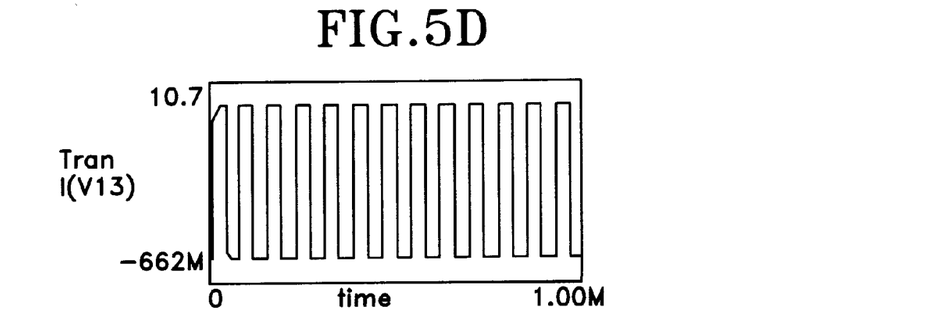
Figure 5E:
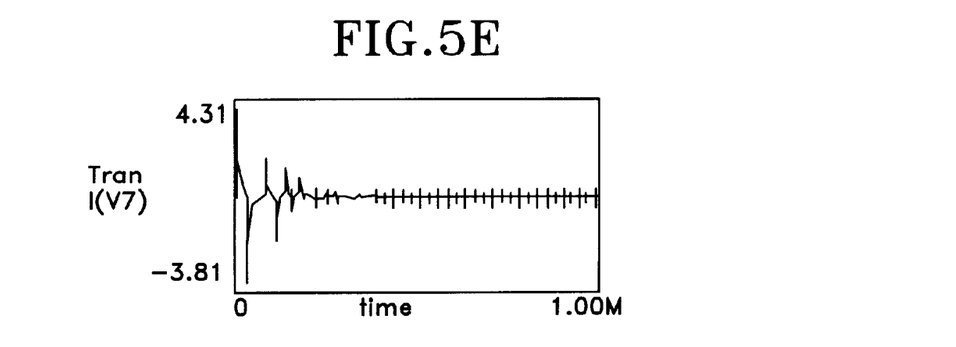
Figure 5F:
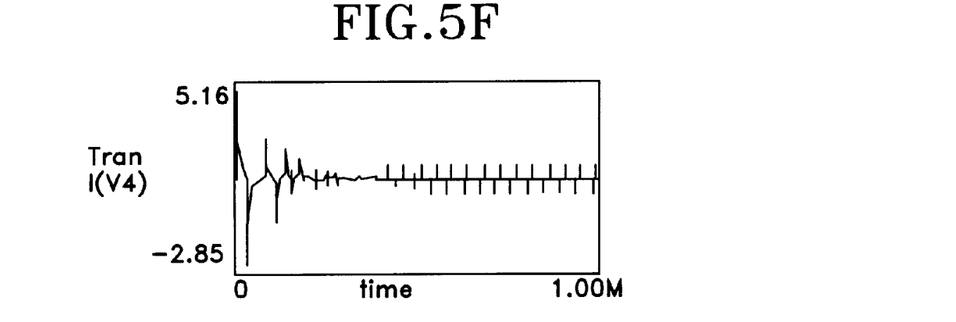
Figure 5G:
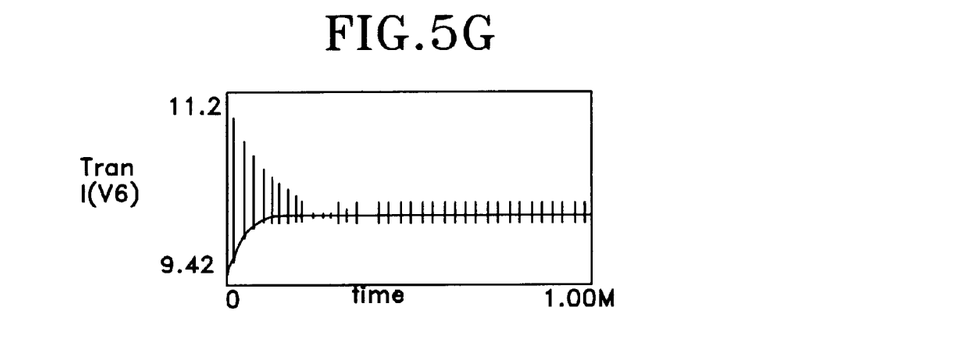
Figure 5H:
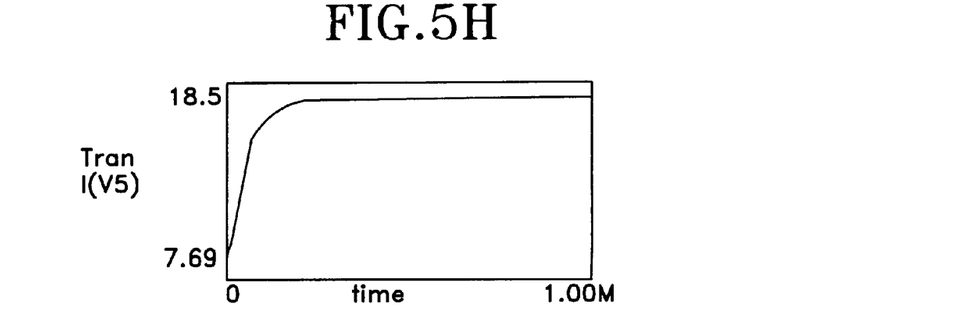
Figure 6:
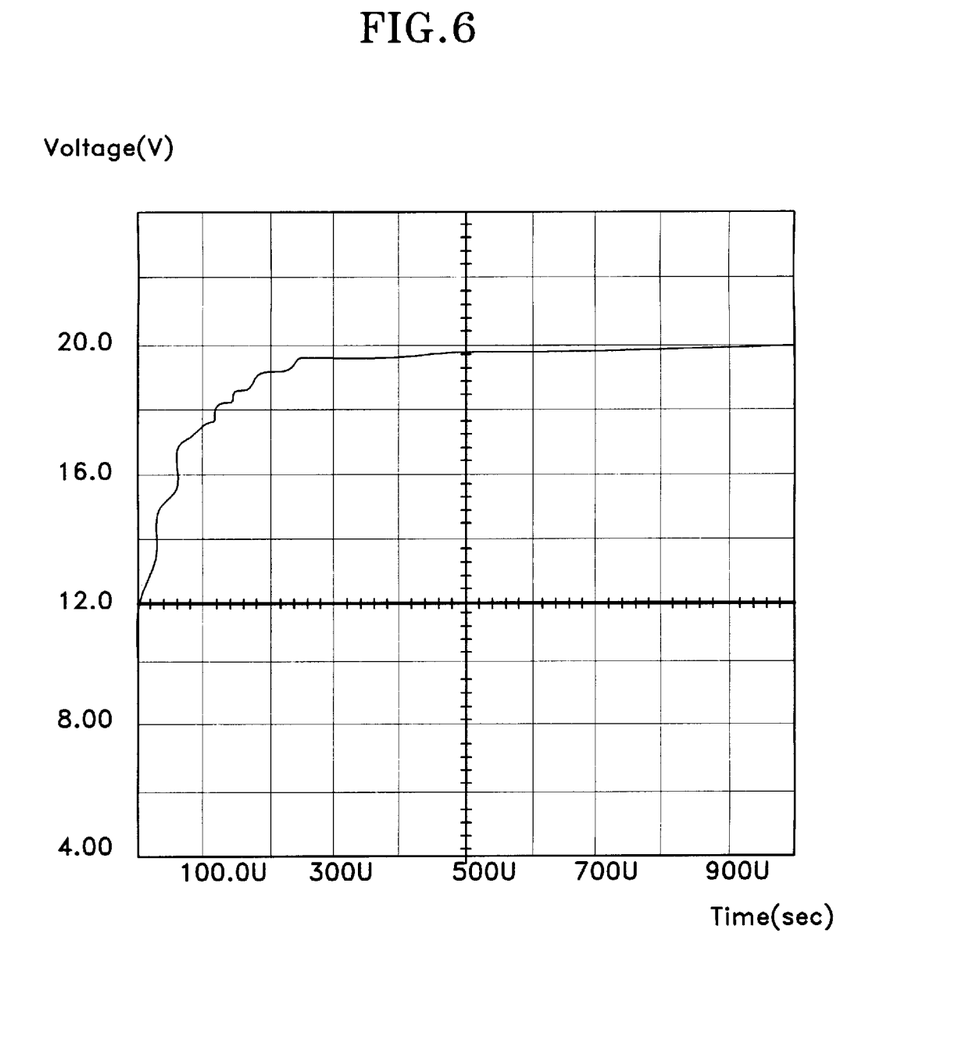
FIG. 6 shows a simulation result of the driving circuit of FIG. 2 obtained by the simulator of FIG. 4.

FIG. 4 is a circuit diagram of a simulator for simulating the operation of the driving circuit of FIG. 2, FIGS. 5 shows waveforms at respective nodes of the simulator of FIG. 4, and FIG. 6 shows a simulation result of the driving circuit of FIG. 2 obtained by the simulator of FIG. 4. In FIG. 6, the horizontal axis shows variation in time and the vertical axis shows variation in output voltage of the first driving voltage generating means 210.

Referring to FIG. 6, the simulation result shows that applied power voltage of 10 V is converted into 20 V after the time lapse of 500 $\mu$sec.

As described above, according to the present invention driving voltage generating circuit of a liquid crystal display, power consumption and effect on switching operation decrease by raising only the gate on voltage and gate off voltage having high power consumption characteristics using the voltage doublers and by making the current flow to the same degree corresponding to the power voltage. In addition, it is possible to apply two times of voltage to the capacitor by making the voltage doublers operate like full wave rectifier. Moreover, by making the current of the voltage doubler flow in only one direction, leakage current is prevented and thereby current consumption decreases. Further, by using MOS transistor as switching element of the voltage doubler, power consumption during operation of the driving circuit decreases and thereby generation of heat decreases.

Various other modifications will be apparent to and can be made by those skilled in the art without departing from the scope and spirit of this invention. Accordingly, it is not intended that the scope of the claims appended hereto be limited to the description as set forth herein, but rather that the claims be broadly construed.

What is claimed is:

1. A driving circuit for generating driving voltages of a liquid crystal display having a plurality of thin film transistors, each of which includes a source, a drain, and a gate, comprising:
    a switching part of generating first to fourth control signals which swing between a first power voltage and a second power voltage using first to fourth input logic control signals;
    a driving voltage generating part controlled by the first to fourth control signals, for generating gate on and off voltages for turning on and off the thin film transistors by raising said second power voltage to a voltage in a first range of voltages and dropping said first power voltage to a voltage in a second range of voltages, wherein said first range of voltages is completely dissimilar to said second range of voltages; and
    a voltage maintenance part for maintaining said gate on and off voltages inputted from said driving voltage generating part at selected voltage levels.

2. The driving circuit in claim 1, further comprising a reverse current preventive part of for preventing current of said voltage maintenance part form flowing to said driving voltage generating part.

3. The driving circuit in claim 2, wherein said reverse current, preventive part comprising:
    a first current preventive means for preventing inverse current of said gate on voltage of said voltage maintenance part to said driving voltage generating part; and
    a second current preventive means for preventing inverse current of said gate off voltage of said voltage maintenance part to said driving voltage generating part.

4. The driving circuit in claim 3, wherein said first current preventive means and second current preventive means include shottkey diodes, forwardly connected between said driving voltage generating part and said voltage maintenance part.

5. The driving circuit in claim 1, wherein said driving voltage generating part comprises:
    a first driving voltage generating means for generating said gate on voltage by raising said second power voltage using said first and second control signals among said first to fourth control signals applied from said switching part to produce said first range of voltages; and
    a second driving voltage generating means for generating said gate off voltage by dropping said first power voltage using said third and fourth control signals among said first to fourth control signals applied from said switching part to produce said second range of voltages.

6. The driving circuit in claim 5, wherein said first and second control signals having phases opposite to each other.

7. The driving circuit in claim 5, wherein said first driving voltage generating means comprises first and second voltage doublers for generating said gate on voltage by raising said second power voltage from said first and second control signals applied from said switching part.

8. The driving circuit in claim 7, wherein said first and second control signals have phases opposite to each other.

9. The driving circuit in claim 7, wherein said second power voltage is 10 V, and said gate on voltage is 20 V.

10. The driving circuit in claim 1, wherein said second power voltage is 10 V, and said gate on voltage is 20 V.

11. The driving circuit in claim 7, wherein said second driving voltage generating means comprises third and fourth voltage doublers for generating said gate off voltage by dropping said first power voltage from said third and fourth control signals applied from said switching part.

12. The driving circuit in claim 11, wherein said third and fourth control signals have reversal levels with respect to each other.

13. The driving circuit in claim 11, wherein said second power voltage is 10 V, and said off voltage is −10 V.

14. The driving circuit in claim 1, wherein said voltage maintenance part comprises:
    a first voltage maintenance means for maintaining said gate on voltage inputted from said driving voltage generating part at a first one of said selected voltage levels; and
    a second voltage maintenance means for maintaining said gate off voltage inputted from said driving voltage generating part at a second one of said selected voltage levels.

15. The diving circuit in claim 14, wherein said first voltage maintenance means comprises a condenser having a first end, which is connected to a ground terminal, and a second end, which is connected to said driving voltage generating part.

16. The diving circuit in claim 14, wherein said second voltage maintenance means comprises a condenser having a first end, which is connected to a ground terminal, and a second end, which is connected to said driving voltage generating part.

17. The driving circuit in claim 1, wherein said first power voltage is 0 V, and said second power voltage is 10 V.

18. A driving circuit for generating driving voltages of a liquid crystal display having a plurality of thin film transistors, each of which includes a source, a drain, and a gate, comprising:
    a switching part for generating first to fourth control signals which swing between a first power voltage and a second power voltage using first to fourth input logic control signals;
    a driving voltage generating part controlled by the first to fourth control signals, for generating gate on and off voltages for turning on and off the thin film transistors by raising said second power voltage and dropping said first power voltage;
    a voltage maintenance part for maintaining said gate on and off voltages inputted from said driving voltage generating part at selected voltage levels; and a reverse current preventive part for preventing current of said voltage maintenance part from flowing to said driving voltage generating part, said reverse current preventive part including a first current preventive means for preventing inverse current of said gate on voltage of said voltage maintenance part to said driving voltage generating part, and a second current preventive means for preventing inverse current of said gate off voltage of said voltage maintenance part to said driving voltage generating part.

19. The driving circuit in claim 18, wherein said first current preventive means and second current preventive means include shottkey diodes forwardly connected between said driving voltage generating part and said voltage maintenance part.

20. A driving circuit for generating driving voltage of a liquid crystal display having a plurality of thin film transistors, each of which includes a source, a drain, and a gate, comprising:

a switching part for generating first to fourth control signals which swing between a first power voltage and a second power voltage using first to fourth input logic control signals;

a driving voltage generating part controlled by the first to fourth control signals, for generating gate on and off voltages for turning on and off the thin film transistors by raising said second power voltage and dropping said firs power voltage; and a voltage maintenance part for maintaining said gate on and off voltages inputted from said driving voltage generating part at selected voltage levels, said voltage maintenance part including a first voltage maintenance means for maintaining said gate on voltage inputted from said driving voltage generating part at a first one of said selected voltage levels, and a second voltage maintenance means for maintaining said gate off voltage inputted from said driving voltage generating part at a second one of said selected voltage levels, said first voltage maintenance means including a condenser having a first end, which is connected to a ground terminal, and a second end, which is connected to said driving voltage generating part.

21. A driving circuit for generating driving voltages of a liquid crystal display having a plurality of thin film transistors, each of which includes a source, a drain, and a gate, comprising:

a switching part for generating first to fourth control signals which swing between a first power voltage and a second power voltage using first to fourth input logic control signals;

a driving voltage generating part controlled by the first to fourth control signals, for generating gate on and off voltages for turning on and off the thin film transistors by raising said second power voltage and dropping said first power voltage; and a voltage maintenance part for maintaining said gate on and off voltages inputted from said driving voltage generating part at selected voltage levels said voltage maintenance part including a first voltage maintenance means for maintaining said gate on voltage inputted from said driving voltage generating part at a first one of said selected voltage levels, and a second voltage maintenance means for maintaining said gate off voltage inputted from said driving voltage generating part at a second one of said selected voltage levels, said second voltage maintenance means including a condenser having a first end, which is connected to a ground terminal, and a second end, which is connected to said driving voltage generating part.

* * * * *

UNITED STATES PATENT AND TRADEMARK OFFICE
CERTIFICATE OF CORRECTION

PATENT NO.    : 6,144,357
DATED         : November 7, 2000
INVENTOR(S)   : Tae Bo Jeong It is certified that error appears in the above-identified patent and that said Letters Patent is hereby corrected as shown below:

<u>Title page, Item [54] and Column 1, line 2,</u>
After the word "CIRCUIT", delete "VOLTAGE".

Signed and Sealed this

Fourth Day of February, 2003

JAMES E. ROGAN
*Director of the United States Patent and Trademark Office*